US012759733B2

(12) United States Patent
Johnson

(10) Patent No.: US 12,759,733 B2
(45) Date of Patent: Oct. 13, 2026

(54) PAYLOAD SEPARATION DEVICE AND METHOD

(71) Applicant: REPRISE SPACE SOLUTIONS, LLC, Houston, TX (US)

(72) Inventor: Michael David Johnson, Houston, TX (US)

(73) Assignee: REPRISE SPACE SOLUTIONS, LLC, Houston, TX (US)

( * ) Notice: Subject to any disclaimer, the term of this patent is extended or adjusted under 35 U.S.C. 154(b) by 0 days.

(21) Appl. No.: 19/386,094

(22) Filed: Nov. 11, 2025

(65) Prior Publication Data

US 2026/0062153 A1 Mar. 5, 2026

Related U.S. Application Data

(63) Continuation-in-part of application No. 19/172,567, filed on Apr. 7, 2025, now Pat. No. 12,492,018.

(60) Provisional application No. 63/750,775, filed on Jan. 29, 2025, provisional application No. 63/575,893, filed on Apr. 8, 2024.

(51) Int. Cl.
*B64G 1/64* (2006.01)

(52) U.S. Cl.
CPC .................................... *B64G 1/642* (2023.08)

(58) Field of Classification Search
CPC ...... B64G 1/642; B64G 1/645; B64G 1/6457; F42B 15/36; F42B 2/08; F42B 2200/509
See application file for complete search history.

(56) References Cited

U.S. PATENT DOCUMENTS

| | | | |
|---|---|---|---|
| 6,227,493 | B1 | 5/2001 | Holemans |
| 6,343,770 | B2 | 2/2002 | Holemans |
| 6,390,416 | B2 | 5/2002 | Holemans |
| 7,861,976 | B2 | 1/2011 | Holemans |
| 8,550,408 | B2 | 10/2013 | Ross |
| 9,707,748 | B2 | 7/2017 | Holemans |
| 10,634,473 | B2 | 4/2020 | Travis |
| 11,009,326 | B2 | 5/2021 | Travis |
| 2001/0017337 | A1 | 8/2001 | Holemans |
| 2002/0014558 | A1 | 2/2002 | Holemans |
| 2012/0012711 | A1 | 1/2012 | Ross |
| 2015/0211832 | A1 | 7/2015 | Travis |
| 2020/0149850 | A1 | 5/2020 | Travis |
| 2024/0228070 | A1 | 7/2024 | Kuehn |

FOREIGN PATENT DOCUMENTS

| | | | |
|---|---|---|---|
| CN | 106742081 | B | 2/2021 |
| JP | 2024097079 | A | 5/2025 |

*Primary Examiner* — Philip J Bonzell
(74) *Attorney, Agent, or Firm* — HULSEY P.C.

(57) ABSTRACT

This disclosure relates generally to a payload separation system utilizing a circular arch connective mechanism for connecting and releasing a payload from a launch vehicle. The apparatus of the invention is particularly useful for spacecraft and other vehicular separation mechanisms.

19 Claims, 8 Drawing Sheets

PAYLOAD SEPARATION DEVICE AND METHOD

CROSS-REFERENCE TO RELATED APPLICATIONS

The present application claims the benefit of U.S. Provisional Application No. 63/575,893 titled Payload Separation Device and Method, filed Apr. 8, 2024, U.S. Provisional Application No. 63/750,775 titled Payload Separation Device and Method, filed Jan. 29, 2025; and U.S. Non-Provisional application Ser. No. 19/172,567 titled Payload Separation Device and Method, filed Apr. 7, 2025, all of which are incorporated herein in their entirety and referenced thereto.

BACKGROUND OF THE INVENTION

Field of the Invention

This disclosure relates generally to a payload separation system utilizing a circular arch connective mechanism for connecting and releasing a payload from a launch vehicle.

Description of the Prior Art

Launch vehicles (a.k.a. rockets) and spacecraft have long required specialized separation systems for various situations. Launch vehicles require separation systems for separating rocket stages or payloads and spacecraft require separation systems for releasing solar arrays or antennas amongst other things.

Many separation systems have been utilized over the years but have had a variety of shortcomings. The paradox of separation devices is that they "Must Hold" and "Must Release" at different times. For example, pyrotechnic bolts have been utilized but have the shortcoming of not being testable prior to utilization as well as generating large shock forces upon separation and debris generation. Non-pyrotechnic separation nuts have also been utilized but, since the restraining nut in the system is split, the holding strength of the nut is less than a traditional nut and bolt connection. Various other systems (e.g. TiNi Frangibolt, TiNi shape memory actuators, burn wires, etc.) have been utilized with some success but all suffer from relatively weak load capability.

Other more complicated satellite separation systems have been devised. For example, the Planetary Systems Lightband Mark II and Advanced Lightband are disclosed by Holemans in U.S. Pat. No. 7,861,976. This system is extremely complex, and the load path structure is compromised since the complex securing mechanism tends to concentrate loads across multiple, small connecting interfaces.

Another, more simplified satellite separation system is disclosed by Holemans in U.S. Pat. No. 9,707,748. This system is based on a series of flexure hooks that, unfortunately, concentrate interface loads across multiple, small connecting interfaces.

Another complicated satellite separation system is disclosed in Schwarz, et. al. in JP2024097079A. This system is essentially a circular ring geometry with a collection of separation pins on the satellite side and mechanically actuated sockets on the launch vehicle side. Unfortunately, this system tends to concentrate loads on to the limited number of separation pin and socket sets.

Yet another satellite separation system is disclosed in CN106742081B which discloses an inverted clamp band structure that unfortunately minimizes the diameter of the structural ring connecting the satellite to launch vehicle thus concentrating loads.

Structural engineers consider a circular arch an extremely strong self-supporting structure. A circular form of an arch utilizes voussoirs set in a circle which are compressed with an external compression band. The external compression forces are distributed laterally in a circular path. This is essentially how wooden barrels are constructed.

The disclosed subject matter helps to avoid these and other problems.

SUMMARY OF THE INVENTION

This disclosure relates generally to a separation system utilizing two circular arch elements with interleaved voussoirs connecting a payload to a launch vehicle and a compression band to hold the two circular arch elements together.

The main advantage of using the invention is the immense structural strength provided by the distribution of loads across the circular arch elements.

BRIEF DESCRIPTION OF THE DRAWINGS

A more complete understanding of the invention and the many attendant advantages thereof will be readily appreciated as the same becomes better understood by reference to the following detailed description, when considered in connection with the accompanying drawings wherein.

DESCRIPTION OF THE PREFERRED EMBODIMENT

Figure 1:
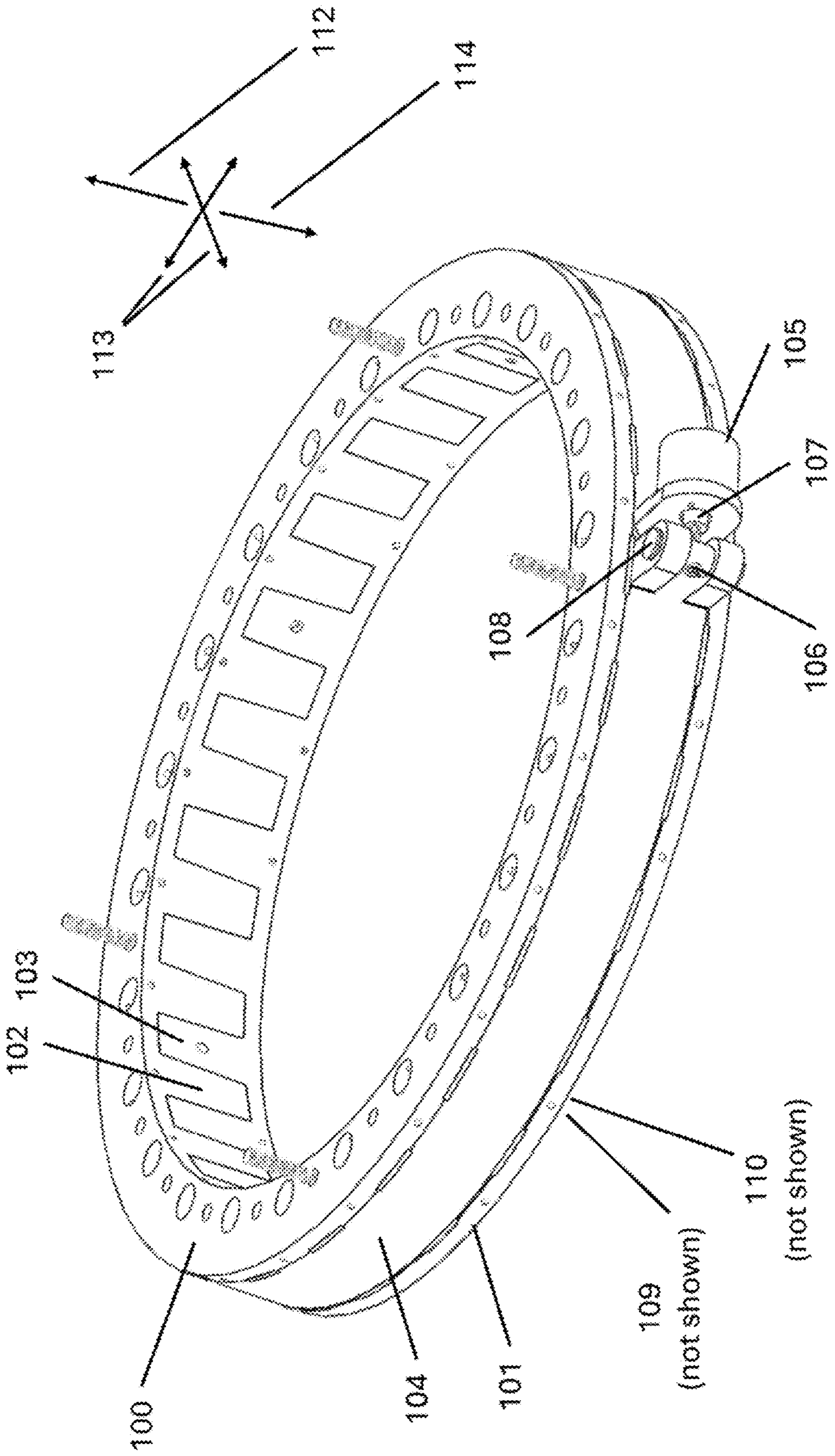
FIG. 1 is a view of the first embodiment while engaged.

The inventive device utilizes a geometric constraining method of attachment between a satellite flyaway ring and a launch vehicle stay-behind ring. The primary constraining mechanism uses interleaved voussoirs between the flyaway and stay-behind rings that are compressed together by an outer compression band. The compressed voussoirs form a monolithic rigid ring with superior axial and linear strength over current separation systems. The compressed voussoir configuration also provides axial (i.e. launch direction) restraint due to friction. The invention provides a large mechanical advantage since a small tension force in the compression band imposes a large clamping force between the flyaway and stay-behind rings.

The secondary constraining method of the invention (in the axial or launch direction) utilizes chamfered cutouts on the outer diameter of the interleaving voussoirs between the flyaway and stay-behind rings that seat on a chamfered compression band preventing axial axis separation of the flyaway and stay-behind rings.

Conventional compression springs are used to separate and propel the flyaway ring with attached spacecraft away from the stay-behind ring/launch vehicle as soon as the chamfered compression band is released. The interleaved voussoirs prevent rotation of the flyaway ring in all three axes as well as lateral shifting in two axes thus leaving only translation possible in the axial direction (i.e. the deployment direction). The interleaved voussoirs also function as guides during deployment inherently minimizing tipoff rates.

Additionally, a draft angle cut can be introduced between the opposing voussoir faces that enables voussoir separation in a manner like the draft angle introduced between an injection mold and its separating part.

Linear bearings may also be utilized to maintain parallel relationship (i.e. prevent relative tilting) between the separating stay-behind and flyaway interleaved voussoirs rings to prevent jamming during separation due to a wedging effect between the separating voussoirs.

The chamfered compression band is preferably constrained via an electric motor actuated screw mechanism using a brushless motor with a planetary reduction gearbox capable of operating in a low or zero pressure environment but can be of any motive power deemed convenient for the application (e.g. brushed electric motor, pneumatic motor, hydraulic motor, etc.).

The chamfered compression band may also be constrained by a separation nut, well known in prior art, that can be actuated by various means (e.g. pyrotechnic, shape memory alloy, burn wire, paraffin expansion, frangible bolt, etc.). For example, a TiNi separation nut is commercially available to perform this function.

Another advantage offered by the invention is the incorporation and containment of the separation springs within the volume of the voussoir elements.

The invention also permits the utilization of radial ejection pins to urge the compression band away from the separating stay-behind ring and flyaway ring while simultaneously restraining the compression ring from ejection from the stay-behind ring. Radial ejection pins are captured in a groove formed on the inner diameter of the compression band which prevents the compression band from flying away from the stay-behind ring after release of the compression band.

The invention also permits utilization of cup and cone features on the stay-behind and flyaway rings that provide shear force (i.e. lateral forces perpendicular to the deployment direction) transmission between the stay-behind and flyaway rings of the invention.

Utilization of the combination of the interleaved arch elements combined with a chamfered compression band in a separation system provides the following advantages: 1. The maximum strength of the arch structure can be utilized via distribution of loads across the voussoir elements, 2. The system may be tested for “Must Hold” (i.e. launch period) and “Must Release” (i.e. deployment period) states any number of times and reset, 3. Disconnection of “Must Hold” and “Must Release” state risk sources, and 4. Increased reliability by minimizing the part count of the system.

Some other applications of the separation system include submarine torpedo release mechanisms, submarine door release mechanisms, and underwater cable release mechanisms. Some aircraft applications are bomb release mechanisms, fuel tank release mechanisms, landing gear release mechanisms, munitions release mechanisms and aircraft door release mechanisms. Some launch vehicle applications include rocket stage separation systems, payload separation systems and landing gear release mechanisms. Some spacecraft applications include solar array release mechanisms and antenna release mechanisms amongst other things.

In FIG. 1 the inventive device utilizes a geometric constraining method of attachment between flyaway ring 100 and stay-behind ring 101. The primary constraining mechanism uses voussoir 102 on flyaway ring 100 and voussoir 103 on stay-behind ring 101 that are compressed together by an outer compression band 104.

Outer compression band 104 is constrained by gear motor 105 driving nut 107 to release screw 106 which is received by pin 108. This configuration permits the release of compression band 104 by operation of motor 105.

Spring housings 109 (not shown in FIG. 1) embedded in stay-behind ring 101 contain conventional separation compression springs 110 (not shown in FIG. 1) that react against flyaway ring 100.

Compressed voussoirs 102 and 103 form a monolithic rigid ring with superior axial axis 112 and linear axes 113 strength over current separation systems. The compressed voussoir configuration provides axial axis 112 (i.e. launch direction) restraint due to friction in combination with the geometric constraint provided by the compression ring 104 chamfered recess into the groove formed between flyaway ring 100 against stay-behind ring 101. Axis 114 is constrained in compression of flyaway ring 100 against stay-behind ring 101.

Figure 2:
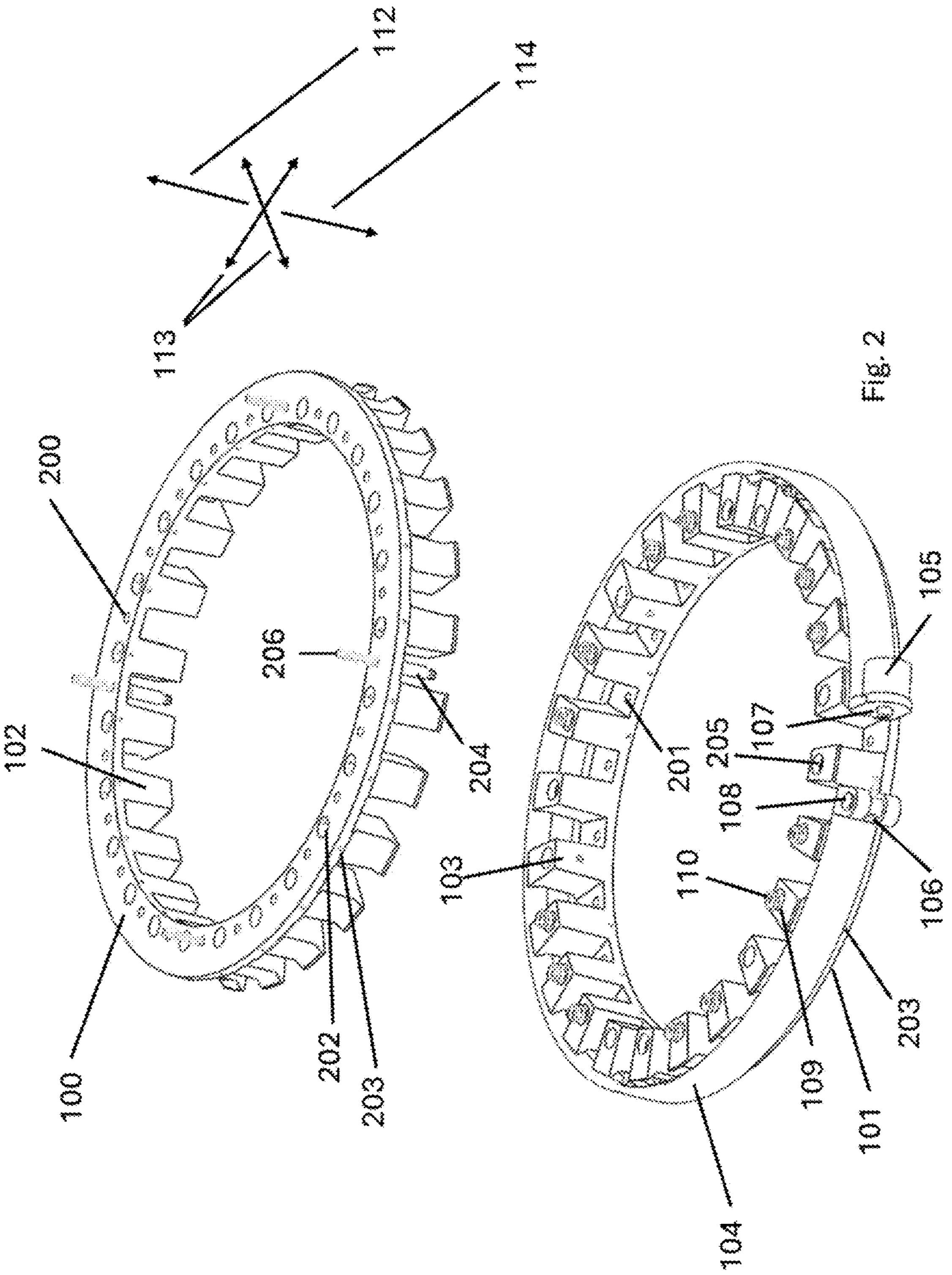
FIG. 2 is a view of the first embodiment while disengaged.

In FIG. 2 compression band 104 is released via release assembly motor 105 unscrewing nut 107 releasing screw 106 held by pin 108 releasing flyaway ring 100 from stay-behind ring 101. Separation springs 110 located in recesses 109 push flyaway ring 100 from stay-behind ring 101. Bolt holes 200 are bolt through holes to attach a payload (not shown) to flyaway ring 100. Bolt holes 201 are bolt through holes to attach stay-behind ring 101 to a launch vehicle (not shown). Corresponding clearance holes 202 are provided in flyaway ring 100 at the mating face of the voussoirs 102 and stay-behind ring 101 at the mating face of the voussoirs 103 to accommodate bolt heads from bolts in holes 200 and 201 respectively. Note that springs 110 may be restrained using pins or wires in holes 203 to keep springs 110 from escaping the assembly after release. Additional springs 110 may be added to clearance holes 202 and restrained by pins in holes 203 on the flyaway ring to provide addition separation spring force if desired.

At least three (preferably four) linear bearing guide rods 204 located in flyaway ring 100 slide through linear bearings 205 in stay-behind ring 101 (linear bearing guide rods 204 and linear bearings 205 are spaced equally around the periphery of flyaway ring 100 and stay-behind ring 101) to prevent relative tipping between flyaway ring 100 and stay-behind ring 101 thus preventing jamming between flyaway ring 100 and stay-behind ring 101. The top of linear bearing guide rod 204 has threads 206 that interface with the satellite attached to flyaway ring 100.

Figure 3:
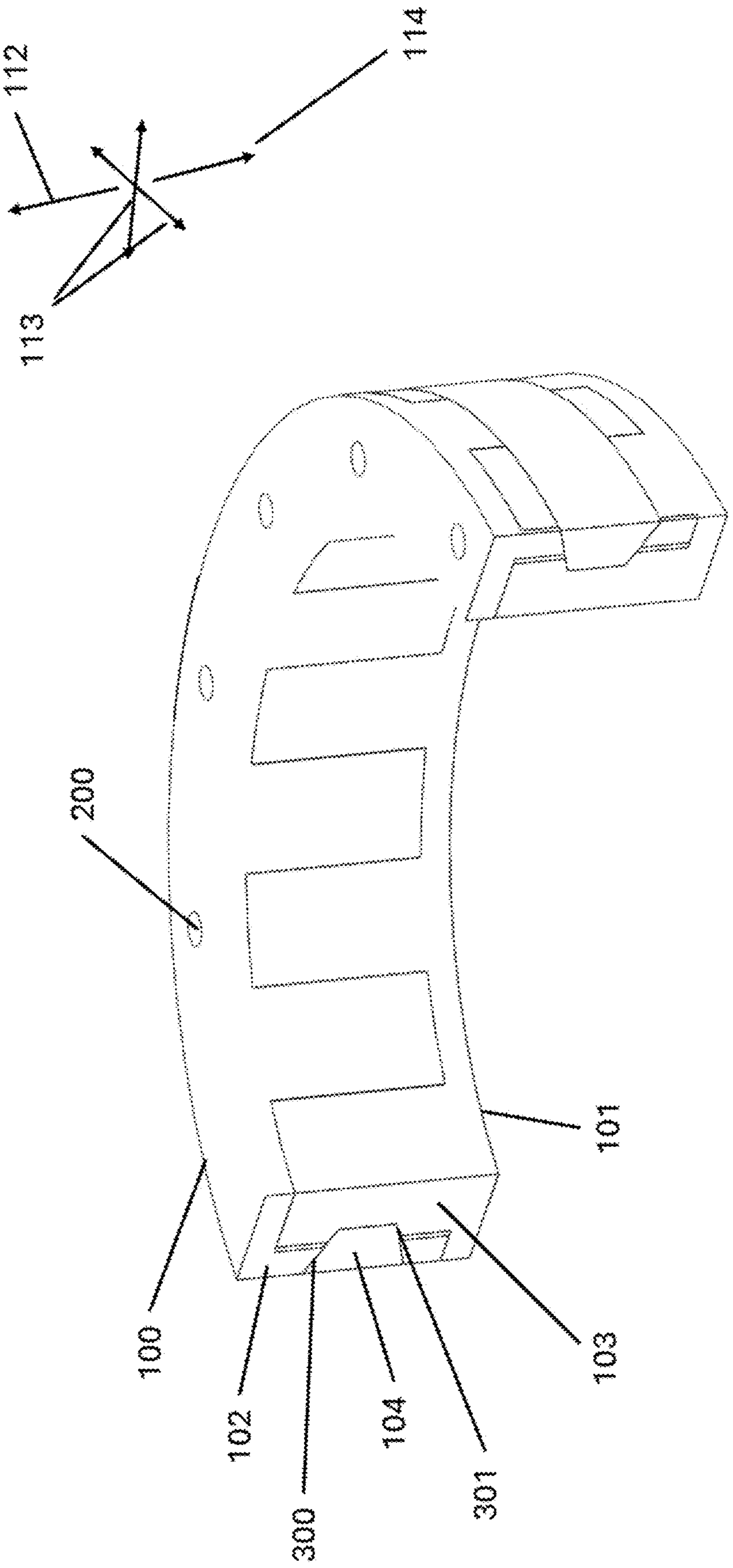
FIG. 3 is a simplified cutaway view of the compression band and interleaved voussoirs while engaged.

FIG. 3 illustrates a smaller diameter and simplified cutaway of the secondary constraining method of the invention (in the axial or launch direction axis 112) which utilizes chamfered cutouts 300 on the outer diameter of both flyaway voussoirs 102 and chamfered cutouts 301 on the outer diameter of stay-behind voussoirs 103 between flyaway ring 100 and stay-behind ring 101 that seat on chamfered compression band 104 preventing axial axis 112 separation of flyaway ring 100 and stay-behind ring 101.

Figure 4:
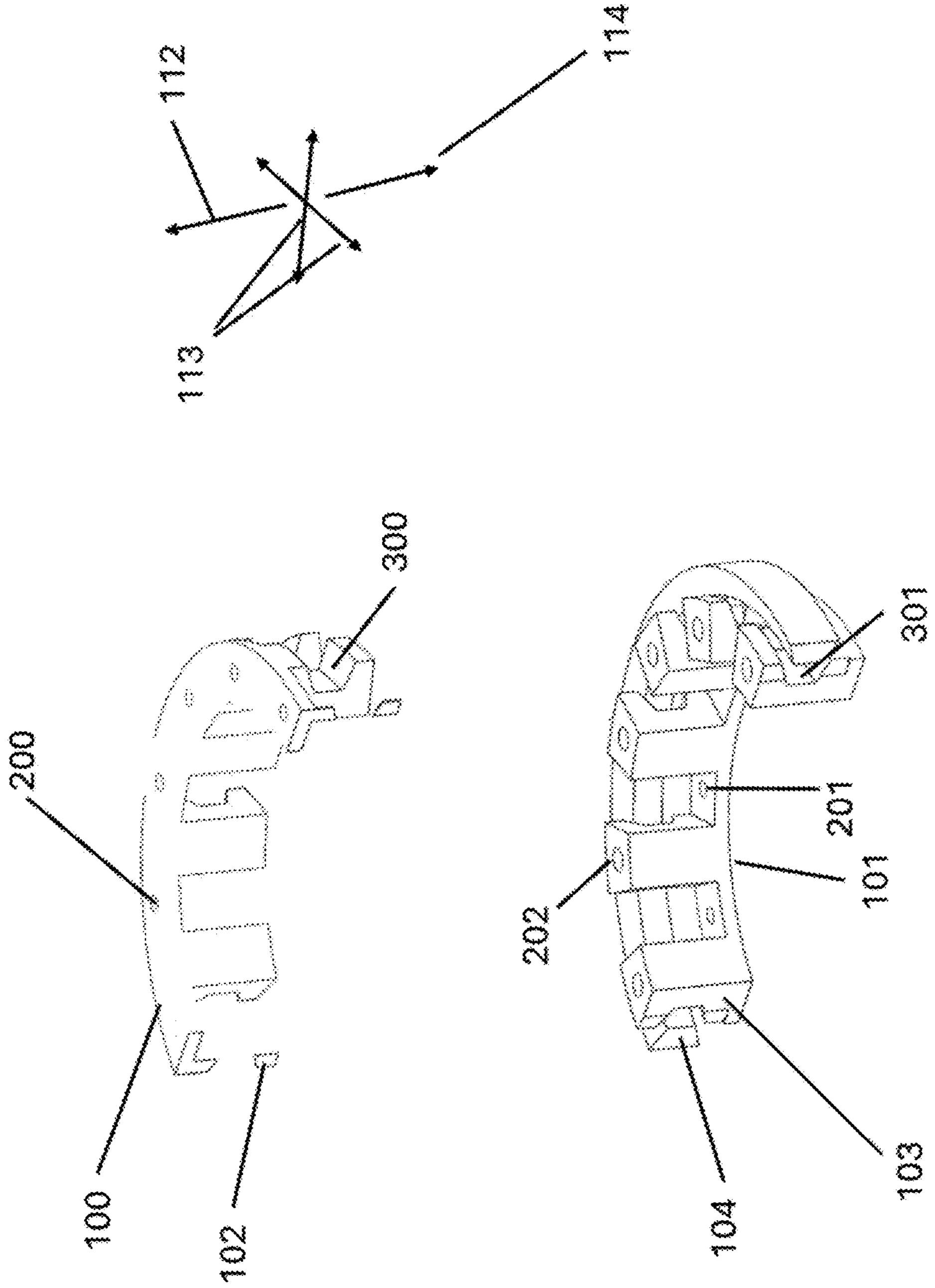
FIG. 4 is a simplified cutaway view of the compression band and interleaved voussoirs while disengaged.

FIG. 4 illustrates a smaller diameter and simplified cutaway of the secondary constraining method after separation of the invention (in the axial or launch direction axis 112) which utilizes chamfered cutouts 300 on the outer diameter of both flyaway voussoirs 102 and chamfered cutouts 301 on the outer diameter of stay-behind voussoirs 103 between flyaway ring 100 and stay-behind ring 101 that seat on chamfered compression band 104 preventing axial axis 112 separation of flyaway ring 100 and stay-behind ring 101.

Conventional compression springs 110 are used to separate and propel flyaway ring 100 with attached spacecraft away from the launch vehicle as soon as chamfered compression band 104 is released. Interleaved voussoirs 102 and 103 prevent rotation of flyaway ring 100 in all three axes as well as lateral shifting in two axes thus leaving only translation possible in axial direction 112 (i.e. the deployment direction). Interleaved voussoirs 102 and 103 also function as guides during deployment in deployment axis 112 inherently minimizing tipoff rates. As stated earlier, at least three (preferably four) linear bearing guide rods 204 located in flyaway ring 100 slide through linear bearings 205 in stay-behind ring 101 (linear bearing guide rods 204 and linear bearings 205 are spaced equally around the periphery of flyaway ring 100 and stay-behind ring 101) to prevent relative tipping between flyaway ring 100 and stay-behind ring 101 thus preventing jamming between flyaway ring 100 and stay-behind ring 101. The top of linear bearing guide rod 204 has threads 206 that interface with the satellite attached to flyaway ring 100.

Chamfered compression band 104 is preferably constrained via motor assembly 105 where electric motor 105 is a brushless motor with a planetary reduction gearbox capable of operating in a low or zero pressure environment but can be of any motive power deemed convenient for the application (e.g. brushed electric motor, pneumatic motor, hydraulic motor, etc.).

In addition, motor assembly 105 could be replaced with a separation nut, well known in prior art, utilizing a pyrotechnic release system, a burn wire release mechanism, a shape memory alloy release mechanism or any other convenient release mechanism that will hold nut 107 with sufficient tension to compress and hold chamfered compression band 104 attached to screw 106 and pin 108 and release, upon electrical command, nut 107 which releases the tension on chamfered compression band 104 causing chamfered compression band 104 to expand and release flyaway ring 100 from stay-behind ring 101.

Figure 4A:
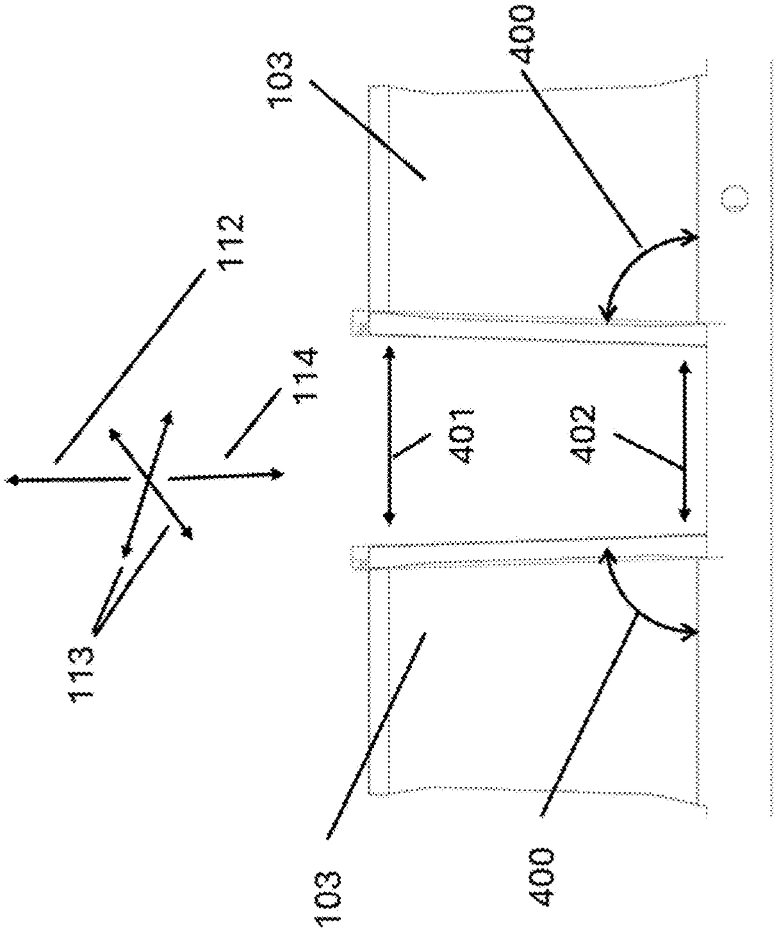
FIG. 4A is a view of the voussoir draft angle detail.

FIG. 4A illustrates a further feature of the inventive device in the application of a draft angle 400 between interleaved voussoirs 102 (not shown) and 103 in separation direction 112. Draft angle 400 refers to the angle of the contacting faces of the interleaved voussoirs 102 and 103 where the interleaved voussoirs 102 and 103 have a wider space 401 between the tops of the interleaved voussoirs 102 and 103 and narrower spacing 402 between the interleaved voussoirs 102 and 103 bases. This feature has the effect of guaranteeing separation of interleaved voussoirs 102 and 103 since a small vertical motion of flyaway ring 100 from stay-behind ring 101 causes a relative face separation (thus reducing risk of jamming) like a plastic part ejection from a drafted wall mold. Linear bearings 205 and guide rods 204 maintain a normal vector separation (with no tilting or rotation) between in direction 112 flyaway ring 100 from stay-behind ring 101 that enhance the draft feature functionality.

Figure 4B:
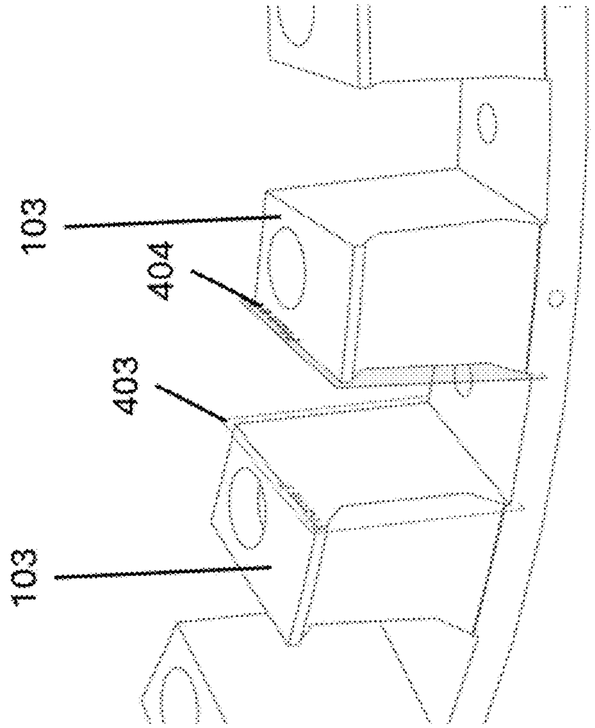
FIG. 4B is a view of the voussoir draft angle plane detail.

FIG. 4B illustrates the planes 403 and 405 formed by applying draft angle 400 to voussoirs 102 (not shown) and 103.

Figure 5:
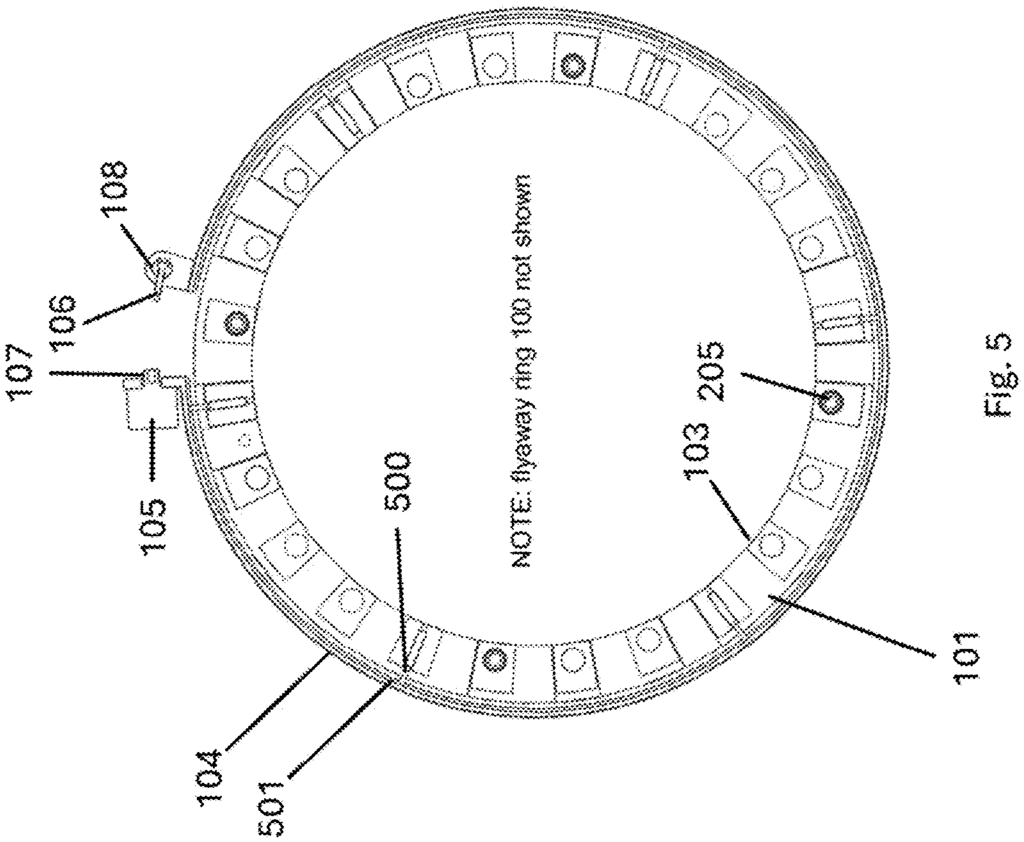
FIG. 5 is a top cutaway view of the compression band radial ejection pin operation.

FIG. 5 is a top cutaway view of the utilization of radial ejection pins 500 to urge compression band 104 away from the separating stay-behind ring 101 and flyaway ring 100 while simultaneously restraining compression band 104 from ejection from stay-behind ring 101. Radial ejection pins 500 are captured in groove 501 formed on the inner diameter in compression band 104 which prevent compression band 104 from flying away from stay-behind ring 101 after release of compression band 104.

Figure 6:
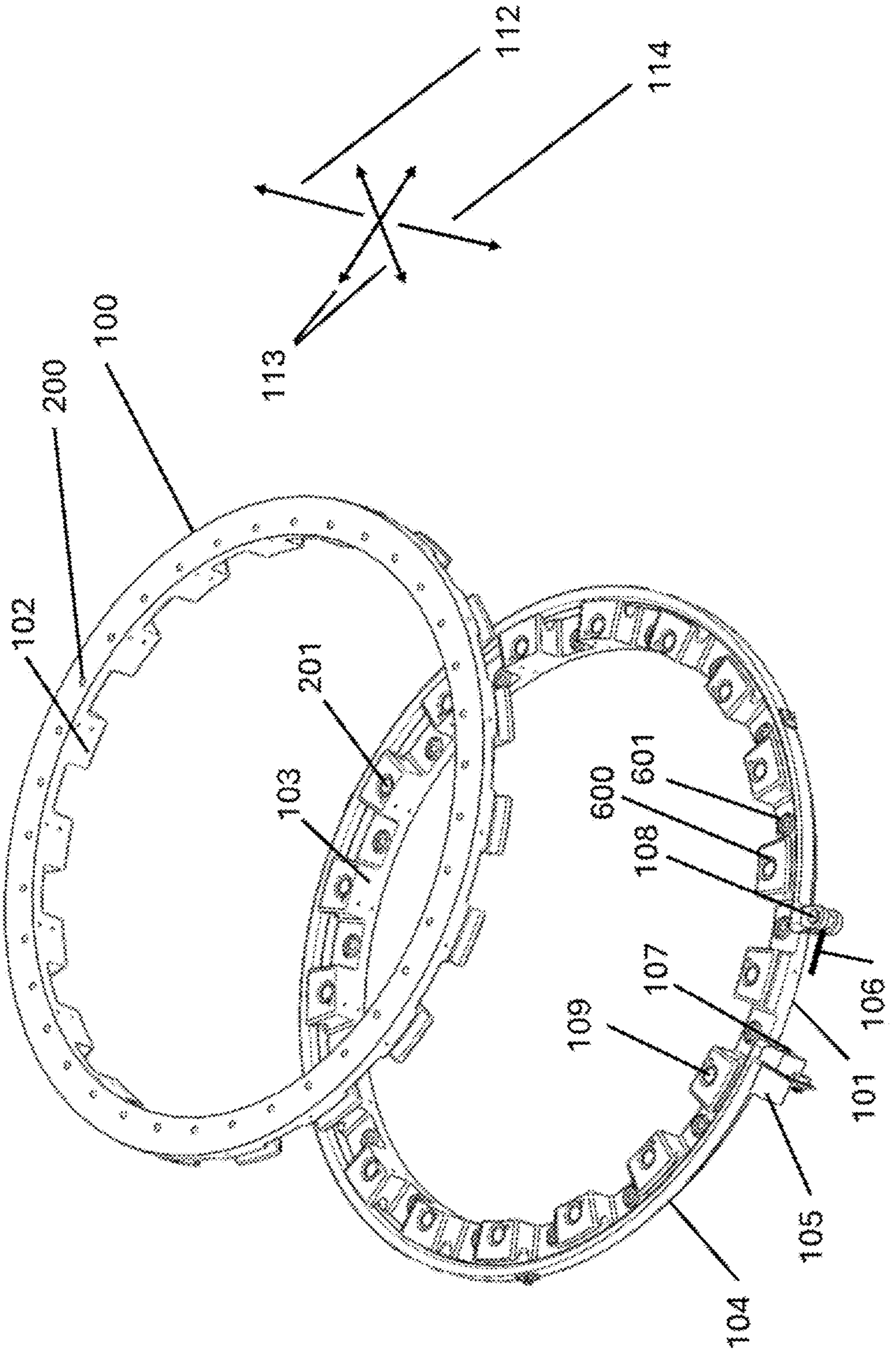
FIG. 6 is view of a second embodiment while disengaged incorporating cup and cone features.

FIG. 6 illustrates an alternate geometry that provides straight line bolt hole 200 and 201 positioning between stay-behind 101 and flyaway 100 rings. The number of voussoirs 102 and 103 on each stay-behind 101 and flyaway 100 rings are equal to one half of the number of bolt holes 200 and 201 in each of the stay-behind 101 and flyaway 100 rings. The angular width of each of the voussoir elements 102 and 103 is equal to 360/(number of bolt holes*0.5) degrees. The previous embodiment illustrated in FIGS. 1 through 5 utilizes voussoir elements 102 and 103 with an angular width equal to 360/(number of bolt holes) degrees. This situation causes the bolt holes 200 and 201 to be staggered equal to 360/(number of bolt holes*2) degrees and not in line with each other.

Also illustrated in FIG. 6 are added cup 600 and cone 601 features that provide increased shear force transmission along linear axes 113 between the stay-behind and flyaway rings.

Figure 7:
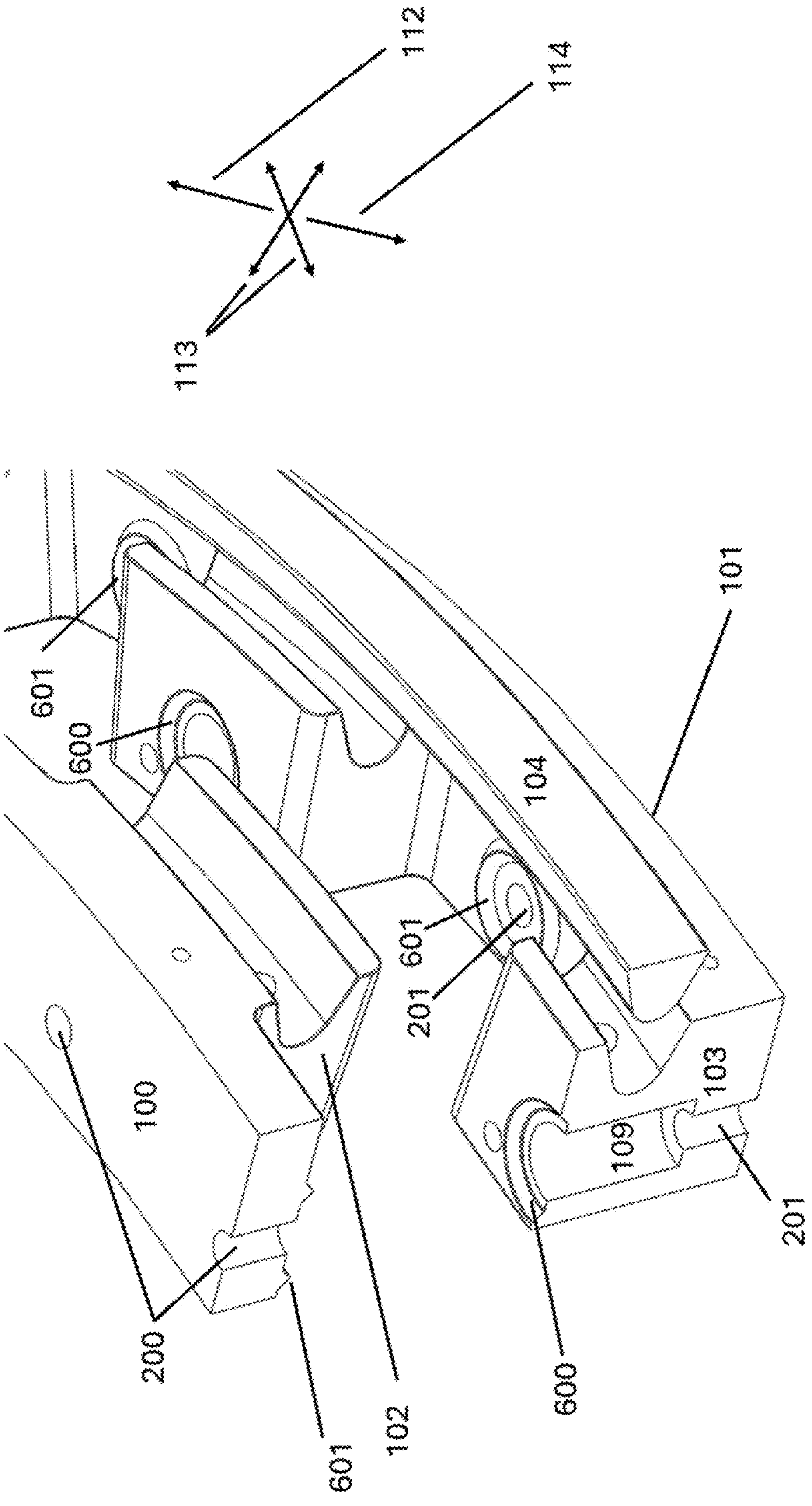
FIG. 7 is a detailed view of the cup and cone features while disengaged.

FIG. 7 is a detailed cutaway illustration of cup 600 and cone 601 features as incorporated into the invention.

Utilization of the combination of the interleaved arch elements 102 and 103 combined with chamfered compression band 104 in a separation system provides the following advantages: 1. The maximum strength of an arch structure can be utilized, 2. The system may be tested for "Must Hold" (i.e. launch period) and "Must Release" (i.e. deployment period) states any number of times and, 3. Operational separation of "Must Hold" and "Must Release" state risk sources, and 4. Increased reliability by minimizing the part count of the system.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A satellite separation system, said satellite separation system comprising in combination:

a first ring comprising a plurality of first bolt holes;

a second ring comprising a plurality of second bolt holes; and a compression band, wherein said first ring contains a set of spaced voussoirs arranged in a circular arch, said second ring contains a set of spaced voussoirs arranged in a circular arch, wherein said spaced voussoirs of said first ring interleave with said second ring spaced voussoirs, said compression band encircles said rings and compresses said voussoirs together to prevent separation of said rings, wherein when said compression band is released, said second ring separates from said first ring along a cylindrical axis of said rings, and wherein the number of said spaced voussoirs on each of said rings are equal to half of the number of said bolt holes in each of said rings.

2. The satellite separation system of claim 1, wherein said plurality of second bolt holes are arranged at equal angular intervals for attachment to a payload.

3. The satellite separation system of claim 1, wherein said plurality of first bolt holes circumferentially arranged at equal angular intervals for attachment to a launch vehicle.

4. The satellite separation system of claim 1, wherein an angular width of each of said spaced voussoirs is equal to 360/(number of said bolt holes*0.5) degrees.

5. The satellite separation system of claim 1, further comprises:

a gear motor configured to drive a nut into engagement with a release screw, said release screw being received by a retention pin to constrain said compression band, wherein actuation of said gear motor unscrews said nut from said release screw to release tension on said compression band causing said compression band to expand and release said second ring from said first ring.

6. The separation system of claim 1, further comprising:

at least three linear bearing guide rods located in said second ring and slidably received in corresponding linear bearings in said first ring, said linear bearing guide rods and said linear bearings being equally spaced around the periphery of said first ring and said second ring to prevent tipping and jamming therebetween.

7. The satellite separation system of claim 1, wherein each of said rings comprises cups and cones.

8. The satellite separation system of claim 7, wherein said cups and cones provide shear force transmission along a linear axis between said rings.

9. A satellite separation system, said satellite separation system comprising in combination:

a stay-behind ring comprising a plurality of first bolt holes circumferentially arranged at equal angular intervals for attachment to a launch vehicle;

a flyaway ring comprising a plurality of second bolt holes circumferentially arranged at equal angular intervals for attachment to a payload; and a compression band;

said stay-behind ring contains a set of spaced voussoirs arranged in a circular arch, wherein said flyaway ring contains a set of spaced voussoirs arranged in a circular arch, wherein said spaced voussoirs of said stay-behind ring interleave with said flyaway ring spaced voussoirs, said compression band encircles said rings and compresses said voussoirs together to prevent separation of said rings, wherein when said compression band is released, said flyaway ring separates from said stay-behind ring along a cylindrical axis of said rings, wherein the number of said spaced voussoirs on each of said rings are equal to half of the number of said bolt holes in each of said rings, and wherein an angular width of each of said spaced voussoirs is equal to 360/(number of said bolt holes*0.5) degrees.

10. The satellite separation system of claim 9, further comprises:

a gear motor configured to drive a nut into engagement with a release screw, said release screw being received by a retention pin to constrain said compression band, wherein actuation of said gear motor unscrews said nut from said release screw to release tension on said compression band causing said compression band to expand and release said flyaway ring from said stay-behind ring.

11. The satellite separation system of claim 9, further comprising:

at least three linear bearing guide rods located in said flyaway ring and slidably received in corresponding linear bearings in said stay-behind ring, said linear bearing guide rods and said linear bearings being equally spaced around the periphery of said stay-behind ring and said flyaway ring to prevent tipping and jamming therebetween.

12. The satellite separation system of claim 9, wherein each of said rings comprises cups and cones.

13. The satellite separation system of claim 12, wherein said cups and cones provide shear force transmission along said a linear axis between said rings.

14. A method of providing a satellite separation system, said method comprising the steps of:

providing a first ring comprising a plurality of first bolt holes;

providing a second ring comprising a plurality of second bolt holes;

providing a compression band;

arranging a set of spaced voussoirs contained in said first ring in a circular arch;

arranging a set of spaced voussoirs contained in said second ring in a circular arch;

configuring the number of said spaced voussoirs on each of said rings to be equal to half of the number of said bolt holes in each of said rings;

configuring said spaced voussoirs of said first ring to interleave with said second ring spaced voussoirs;

configuring said compression band to encircle said rings and compressing said voussoirs together to prevent separation of said rings; and releasing said compression band such that said second ring separates from said first ring along a cylindrical axis of said rings.

15. The method of claim 14, further comprising providing cups and cones on each of said rings such that said cups and cones provide shear force transmission along a linear axis between said rings.

16. The method of claim 14, further comprising configuring an angular width of each of said spaced voussoirs to be equal to 360/(number of said bolt holes*0.5) degrees.

17. The method of claim 14, further comprising introducing a draft angle between opposing faces of said spaced voussoirs to enable separation of said spaced voussoirs.

18. The method of claim 14, further comprising:

providing a gear motor configured to drive a nut into engagement with a release screw, said release screw being received by a retention pin to constrain said compression band, actuating said gear motor to unscrew said nut from said release screw to release tension on said compression band causing said compression band to expand and release said second ring from said first ring.

19. The method of claim 14, further comprising:

providing at least three linear bearing guide rods located in said flyaway ring and slidably received in corresponding linear bearings in said stay-behind ring, said linear bearing guide rods and said linear bearings being equally spaced around the periphery of said stay-behind ring and said flyaway ring to prevent tipping and jamming therebetween.

* * * * *